(12) United States Patent
Hader

(10) Patent No.: US 8,200,521 B2
(45) Date of Patent: Jun. 12, 2012

(54) SYSTEM AND METHOD FOR DETERMINING DEMAND DISTRIBUTION FOR SAFETY STOCK PLANNING

(75) Inventor: Sven Hader, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 1517 days.

(21) Appl. No.: 11/211,842

(22) Filed: Aug. 24, 2005

(65) Prior Publication Data

US 2007/0050222 A1    Mar. 1, 2007

(51) Int. Cl.
*G06Q 10/00*    (2012.01)

(52) U.S. Cl. .................................... 705/7.25

(58) Field of Classification Search ............. 705/10, 705/7.25
See application file for complete search history.

(56) References Cited

U.S. PATENT DOCUMENTS

| | | | | |
|---|---|---|---|---|
| 5,963,919 | A * | 10/1999 | Brinkley et al. | 705/28 |
| 6,151,582 | A * | 11/2000 | Huang et al. | 705/8 |
| 6,931,347 | B2 * | 8/2005 | Boedi et al. | 702/137 |
| 2002/0143669 | A1* | 10/2002 | Scheer | 705/28 |
| 2002/0198794 | A1* | 12/2002 | Williams et al. | 705/28 |
| 2006/0047559 | A1* | 3/2006 | Jacoby et al. | 705/10 |

OTHER PUBLICATIONS

T.M. Williams, "Stock Control with Sporadic and Slow-Moving Demand." The Journal of the Operational Research Society 35:10 (1984). pp. 939-948.*

J. D. Croston, "Forecasting and Stock Control for Intermittent Demands." Operational Research Quarterly 23:3 (1972). pp. 289-303.*

A. H. C. Eaves & B. G. Kingsman, "Forecasting for the Ordering and Stock-Holding of Spare Parts." The Journal of the Operational Research Society 55:4 (2004). pp. 431-437.*

Thomas R. Willemain, et al., "A New Approach to Forecasting Intermittent Demand for Service Parts Inventories." International Journal of Forecasting 20 (2004). pp. 375-387.*

Wayne L. Winston, "Operations Research: Applications and Algorithms," 4th ed., pp. 475-483 (Brooks/Cole 2004).*

* cited by examiner

*Primary Examiner* — Neil Kardos

(74) *Attorney, Agent, or Firm* — Blakely, Sokoloff, Taylor & Zafman LLP

(57) ABSTRACT

A system and method are described for identifying an appropriate demand distribution to use for safety stock planning within a supply chain management ("SCM") system. For example, one embodiment of the invention comprises a computer-implemented method comprising: extracting historical demand characteristics for a product from a specified data source, the demand characteristics including the mean value of the demand for specified periods of time and/or the fraction of periods without any demand; evaluating the historical demand characteristics including the mean value of the demand for the specified periods and/or the fraction of periods without any demand; based on the evaluation, categorizing the demand characteristics into one of two or more different predefined categories; and using the classification to perform safety stock calculations for the product over the specified periods of time.

14 Claims, 9 Drawing Sheets

| Method AS (reorder point strategy with alpha service level) | |
|---|---|
| Input | |
| $\alpha$     alpha service level [in %] <br> $D$     demand forecast for the current period <br> $L$     replenishment lead time for the current period [in periods] <br> $\sigma_{D+L}$     forecast error for the current period <br> $T_C$     control period [in periods] (currently: 1) | |
| Regular Demand | Sporadic Demand |
| $SStck = F_{N(0,1)}^{-1}\left(\dfrac{\alpha}{100}\right)\sigma_{D+L}\sqrt{L+T_C}$ | $p = \dfrac{(D(L+T_C))^2}{\left(\sigma_{D+L}\sqrt{L+T_C}\right)^2}$ <br><br> $\lambda = \dfrac{D(L+T_C)}{\left(\sigma_{D+L}\sqrt{L+T_C}\right)^2}$ <br><br> $s = F_{\Gamma(p,\lambda)}^{-1}\left(\dfrac{\alpha}{100}\right)$    ($s$ - reorder point) <br><br> $SStck = s - D(L+T_C)$ |

*Fig. 5a*

| Method AT (reorder cycle strategy with alpha service level) | | |
|---|---|---|
| Input | | |
| $\alpha$ | alpha service level [in %] | |
| $D$ | demand forecast for the current period | |
| $L$ | replenishment lead time for the current period [in periods] | |
| $\sigma_{D+L}$ | forecast error for the current period | |
| $T_R$ | reorder cycle [in periods] | |
| Regular Demand | | Sporadic Demand |
| $SStck = F^{-1}_{N(0,1)}\left(\dfrac{\alpha}{100}\right)\sigma_{D+L}\sqrt{L+T_R}$ | | $p = \dfrac{(D(L+T_R))^2}{\left(\sigma_{D+L}\sqrt{L+T_R}\right)^2}$ <br><br> $\lambda = \dfrac{D(L+T_R)}{\left(\sigma_{D+L}\sqrt{L+T_R}\right)^2}$ <br><br> $S = F^{-1}_{\Gamma(p,\lambda)}\left(\dfrac{\alpha}{100}\right)$    (S - order-up-to level) <br><br> $SStck = S - D(L+T_R)$ |

*Fig. 5b*

| Method BS (reorder point strategy with beta service level) | |
|---|---|
| Input | |
| $\beta$    beta service level [in %] <br> $D$    demand forecast for the current period <br> $L$    replenishment lead time for the current period [in periods] <br> $\sigma_{D+L}$    forecast error for the current period <br> $T_C$    control period [in periods] (currently: 1) <br> $Q$    reorder quantity | |
| Regular Demand | Sporadic Demand |
| $x_1 = \left(1 - \dfrac{\beta}{100}\right)\left(2QD + D^2 + \sigma_{D+L}^2\right)$ <br><br> $x_2 = \sigma_{D+L}^2 (L + T_C)$ <br><br> $k = \Psi_1^{-1}\left(\dfrac{x_1}{x_2}\right)$    ($k$ - safety factor) <br><br> with   $\Psi_1(x) = \int_x^\infty (t-x)^2 f_{N(0,1)}(t)\,dt$ <br><br> $SStck = k\,\sigma_{D+L}\sqrt{L+T_C}$ | $p_1 = \dfrac{D^2(L+T_C)}{\sigma_{D+L}^2}$ <br><br> $p_2 = \dfrac{D^2 L}{\sigma_{D+L}^2}$ <br><br> $\lambda = \dfrac{D}{\sigma_{D+L}^2}$ <br><br> $s = \Psi_3^{-1}\left(\dfrac{\beta}{100}\right)$    ($s$ - reorder point) <br><br> with $\Psi_3(s) = 1 - \dfrac{1}{2QD + D^2 + \sigma_{D+L}^2}\left(\int_s^\infty (t-s)^2 f_{\Gamma(p1,\lambda)}(t)\,dt - \int_s^\infty (t-s)^2 f_{\Gamma(p2,\lambda)}(t)\,dt\right)$ <br><br> $SStck = s - D(L+T_C)$ |

*Fig. 5c*

| Method BT (reorder cycle strategy with beta service level) | | |
|---|---|---|
| Input | | |
| $\beta$ | beta service level [in %] | |
| $D$ | demand forecast for the current period | |
| $L$ | replenishment lead time for the current period [in periods] | |
| $\sigma_{D+L}$ | forecast error for the current period | |
| $T_R$ | reorder cycle [in periods] | |
| Regular Demand | | Sporadic Demand |
| $x_1 = \left(1 - \dfrac{\beta}{100}\right) T_R D$ $x_2 = \sigma_{D+L}\sqrt{L+T_R}$ $k = \Psi_2^{-1}\left(\dfrac{x_1}{x_2}\right)$     ($k$ - safety factor) with    $\Psi_2(x) = \int_x^\infty (t-x) f_{N(0,1)}(t)\,dt$ $SStck = k\,\sigma_{D+L}\sqrt{L+T_R}$ | | $p = \dfrac{D^2(L+T_R)}{\sigma_{D+L}^2}$ $\lambda = \dfrac{D}{\sigma_{D+L}^2}$ $S = \Psi_4^{-1}\left(\dfrac{\beta}{100}\right)$     ($S$ - order-up-to level) with    $\Psi_4(S) = 1 - \dfrac{1}{DT_R}\int_S^\infty (t-S) f_{\Gamma(p,\lambda)}(t)\,dt$ $SStck = S - D(L+T_R)$ |

*Fig. 5d*

SYSTEM AND METHOD FOR DETERMINING DEMAND DISTRIBUTION FOR SAFETY STOCK PLANNING

BACKGROUND

1. Field of the Invention

This invention relates generally to the field of data processing systems. More particularly, the invention relates to a system and method for identifying an appropriate demand distribution to use for safety stock planning within a supply chain management ("SCM") system.

2. Description of the Related Art

Certain software applications are designed to comprehend complicated scheduling tasks. For example, a supply-chain-management ("SCM") software application is typically designed to comprehend the resources in a supply chain (e.g., raw materials, manufacturing equipment, distribution, warehousing, etc) and schedule their usages (also referred to as "activities") so that a specific "supply" of product can be provided at one or more places at specific times to meet the anticipated "demand" for the product.

FIG. 1 shows a prior art application server 101 architecture that executes SCM application software 102. The SCM application software 102 includes a demand planning module 103 that is responsible for anticipating the demand for a given product over a specified time period or, more specifically, over a series of successive time periods. By way of example, FIG. 2 illustrates a DP module 101 which has anticipated the demand for a particular product (P1) by a particular customer (C1) for January (100 units), February (150 units) and March (100 units). As indicated in FIG. 2, current demand planning techniques are largely based on empirical data 100 for a given product (e.g., historical demand data stored within an archiving system or other database 105).

In addition, as shown in FIG. 1, the demand planning module 103 employed in certain SCM systems includes a "safety stock planning" component 110 for performing "safety stock" calculations. Safety stock planning is used to safeguard the supply chain against negative effects of uncertain influencing factors such as, for example, errors in predicting demand, disruptions in production, fluctuations of transportation times, etc. Safety stock planning attempts to satisfy demands caused by these factors using an "extra" amount of product, i.e., the so-called "safety stock." To calculate the amount of safety stock for a given product, current SCM systems evaluate the demand distribution for the product, which describes the possible demand values for the product over specified periods of time (e.g., a day, week, month, etc) and their relative likelihood.

One problem with current safety stock planning solutions, however, is that they are overly simplistic in the manner in which they characterize demand data used for safety stock calculations. For example, in prior systems, the distinction between "regular" demand (typical for products with high and steady demand, like consumer goods) and "sporadic" demand (typical for products with low and uneven demand, like spare parts) is based on one simple condition. That is, if the variation coefficient of the demand distribution is lower than 0.5, then a "regular" demand is assumed for safety stock planning purposes. A Gaussian distribution is the mathematical model used to characterize a "regular" demand. By contrast, if the variation coefficient of the demand distribution is greater than 0.5, then a "sporadic" demand is assumed for safety stock planning purposes. A Gamma distribution is the mathematical model used to characterize a "sporadic" demand. In addition, prior systems do not consider that the period length used in the historical data (e.g., a day) may not match the period length used for safety stock planning (e.g., a week) and that, therefore, the variation coefficient needs to be adjusted accordingly.

In sum, more advanced techniques for performing safety stock planning using demand distribution data are needed.

SUMMARY

A system and method are described for identifying an appropriate demand distribution to use for safety stock planning within a supply chain management ("SCM") system. For example, one embodiment of the invention comprises a computer-implemented method comprising: extracting historical demand characteristics for a product from a specified data source, the demand characteristics including the mean value of the demand for specified periods of time and/or the fraction of periods without any demand; evaluating the historical demand characteristics including the mean value of the demand for the specified periods and/or the fraction of periods without any demand; based on the evaluation, categorizing the demand characteristics into one of two or more different predefined categories; and using the classification to perform safety stock calculations for the product over the specified periods of time.

BRIEF DESCRIPTION OF THE DRAWINGS

A better understanding of the present invention can be obtained from the following detailed description in conjunction with the following drawings, in which:

FIGS. 5a-d illustrate exemplary formulas for performing safety stock calculations.

DETAILED DESCRIPTION OF PREFERRED EMBODIMENTS

Described below is a system and method for performing safety stock planning by analyzing demand distribution within a supply chain management ("SCM") system. Throughout the description, for the purposes of explanation, numerous specific details are set forth in order to provide a thorough understanding of the present invention. It will be apparent, however, to one skilled in the art that the present invention may be practiced without some of these specific details. For example, although many of the embodiments of the invention described below are based on the advanced supply chain management platform known as the Advanced Planner & Optimizer ("APO") developed by the assignee of the present application, the underlying principles of the invention are not limited to any specific SCM architecture. See, e.g., Gerhard Knolmayer, et al., SUPPLY CHAIN MANAGEMENT BASED ON SAP SYSTEMS (hereinafter "Knolmayer") for a detailed discussion of APO. In other instances, well-known structures and devices are shown in block diagram form to avoid obscuring the underlying principles of the present invention.

Embodiments of the Invention

One embodiment of the invention provides for the efficient and automatic determination of the demand distribution for products based on historical data. In contrast to prior SCM systems which characterize the demand distribution based solely on the variation coefficient of the demand distribution, one embodiment of the invention evaluates various additional characteristics of the demand distribution when performing safety stock planning calculations. These additional characteristics may include, for example, the mean demand value, the standard deviation of the demand distribution, and the fraction of periods without any demand for the product. Based on the values of these characteristics, one embodiment of the invention makes a decision as to whether the demand can be regarded as "regular" or "sporadic." In one embodiment, if the demand is regular (typical for products with high and steady demand, like consumer goods) a Gaussian demand distribution may be assumed. If the demand is sporadic (typical for products with low and uneven demand, like spare parts) a Gamma demand distribution may be assumed. Also the parameters of the demand distribution are derived from the characteristics described above.

Figure 1:
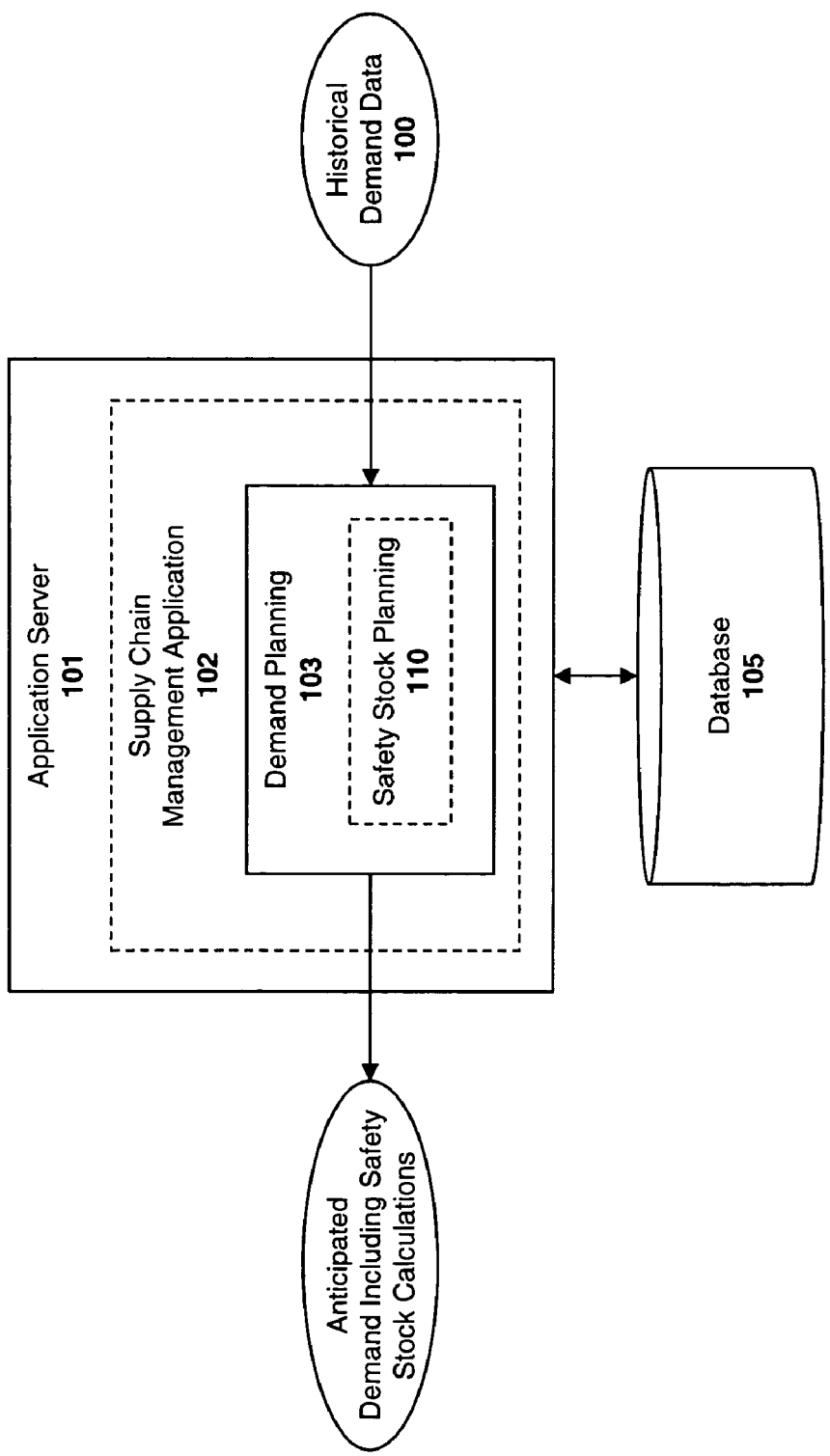
FIG. 1 illustrates a prior art supply chain management architecture which includes a safety stock planning component.
Figure 2:
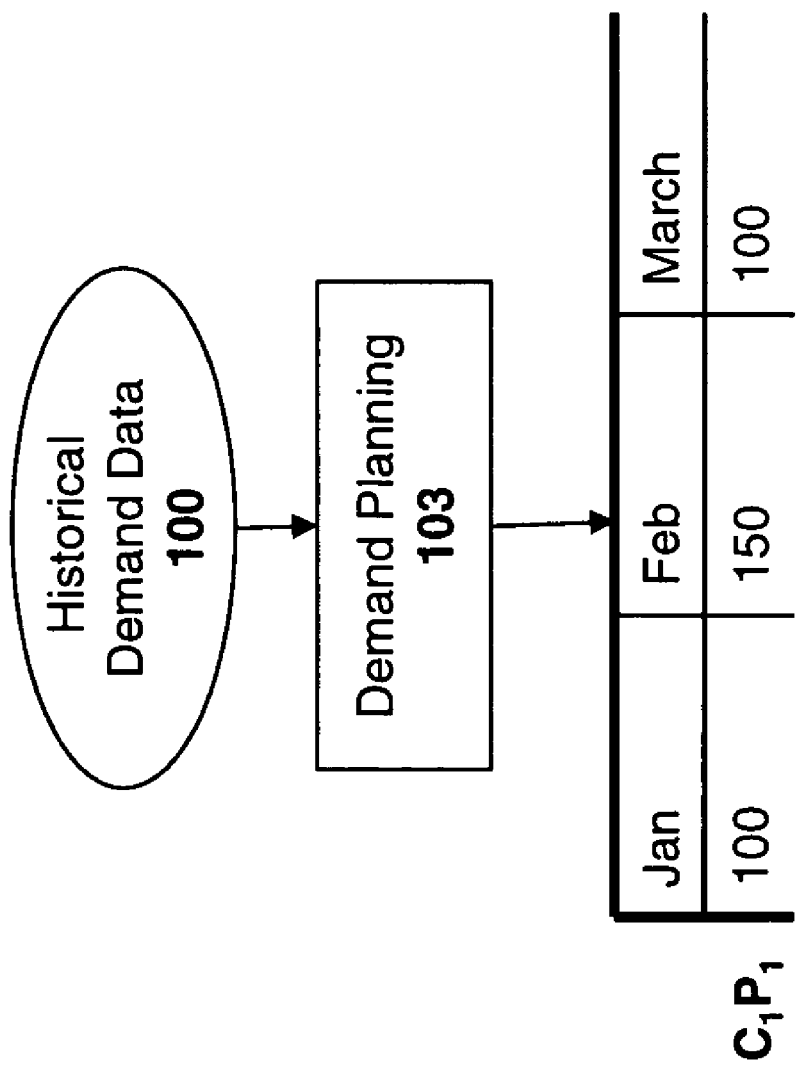
FIG. 2 illustrates the anticipated demand for a product generated by an exemplary demand planning module.
Figure 3:
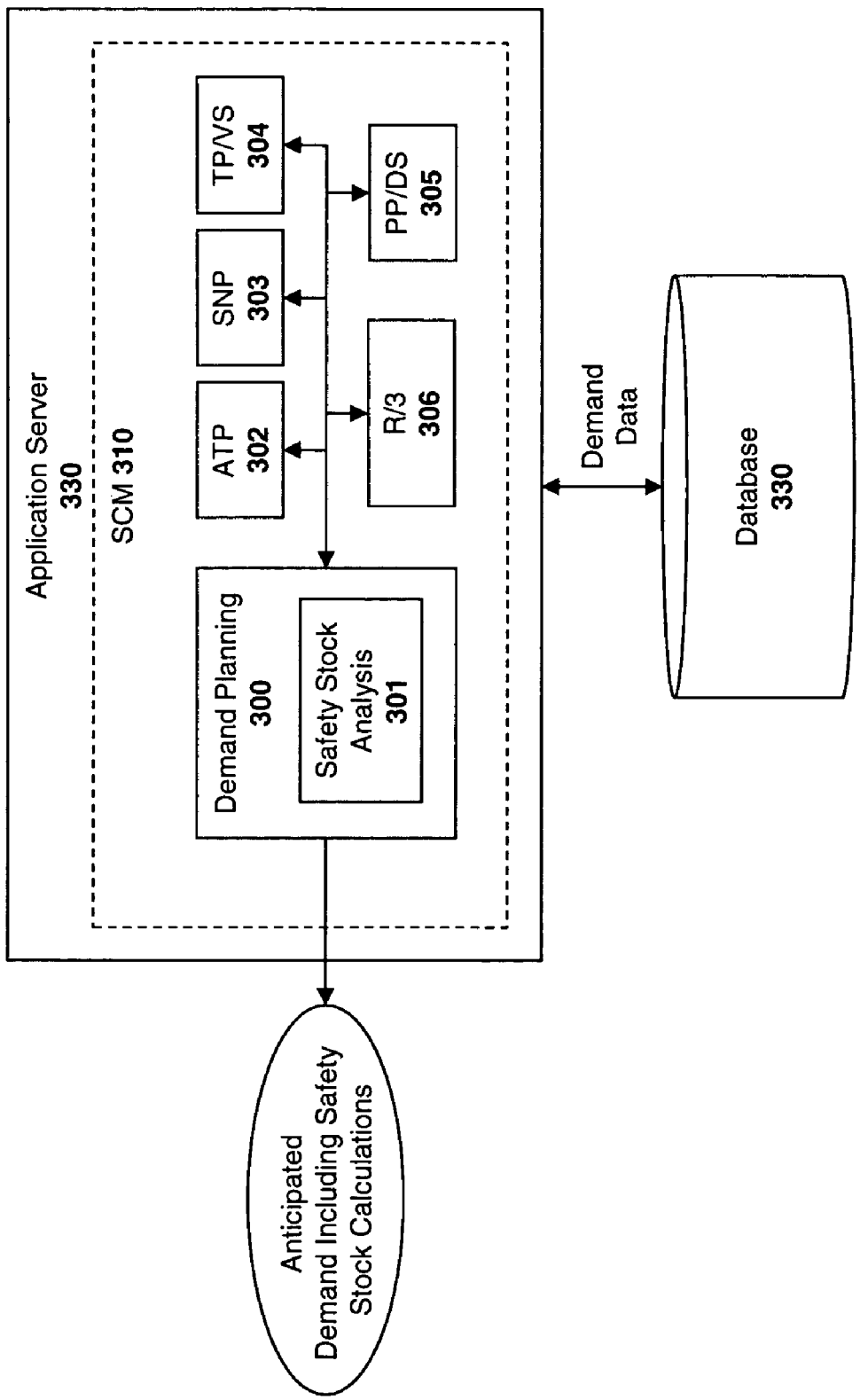
FIG. 3 illustrates a supply chain management architecture including a safety stock analysis component according to one embodiment of the invention.

FIG. 3 illustrates an architecture on which one embodiment of the invention is implemented including a demand planning module 300 with safety stock analysis logic 301 for executing the various safety stock planning techniques described herein. As mentioned above, although not the focus of this patent application, the architecture may include other known components of APO including, for example, an available to promise ("ATP") module 302 (for determining whether a product may be promised to a customer by a particular date), a supply network planning ("SNP") module 303 (for performing tactical supply network scheduling), a transportation planning/vehicle scheduling ("TPNS") module 304 (for performing transportation calculations), and a production planning/detailed scheduling ("PP/DS") module (for performing precise, non-tactical scheduling). In addition, in one embodiment, the SCM architecture includes R/3 systems 306 (for receiving new sales orders). The SCM system illustrated in FIG. 3 also includes a database 330 for storing a variety of SCM data including historical demand data used by the safety stock analysis module 301 when performing its calculations (as described in detail below).

In one embodiment, each of the modules illustrated in FIG. 3 are implemented as program code stored in memory and executed by a central processing unit on an application server 330 (or spread across multiple application servers). Once again, however, the underlying principles of the invention are not limited to any specific hardware/software or SCM application architecture.

It should also be noted that although the safety stock analysis module 301 is illustrated as part of the demand planning module 300 (e.g., as shown in FIG. 3) the specific logical "location" of the safety stock analysis module 301 is not pertinent to the underlying principles of the invention. For example, in one embodiment, the safety stock analysis module 301 forms part of the SNP module 303 rather than the demand planning module 300.

Figure 4:
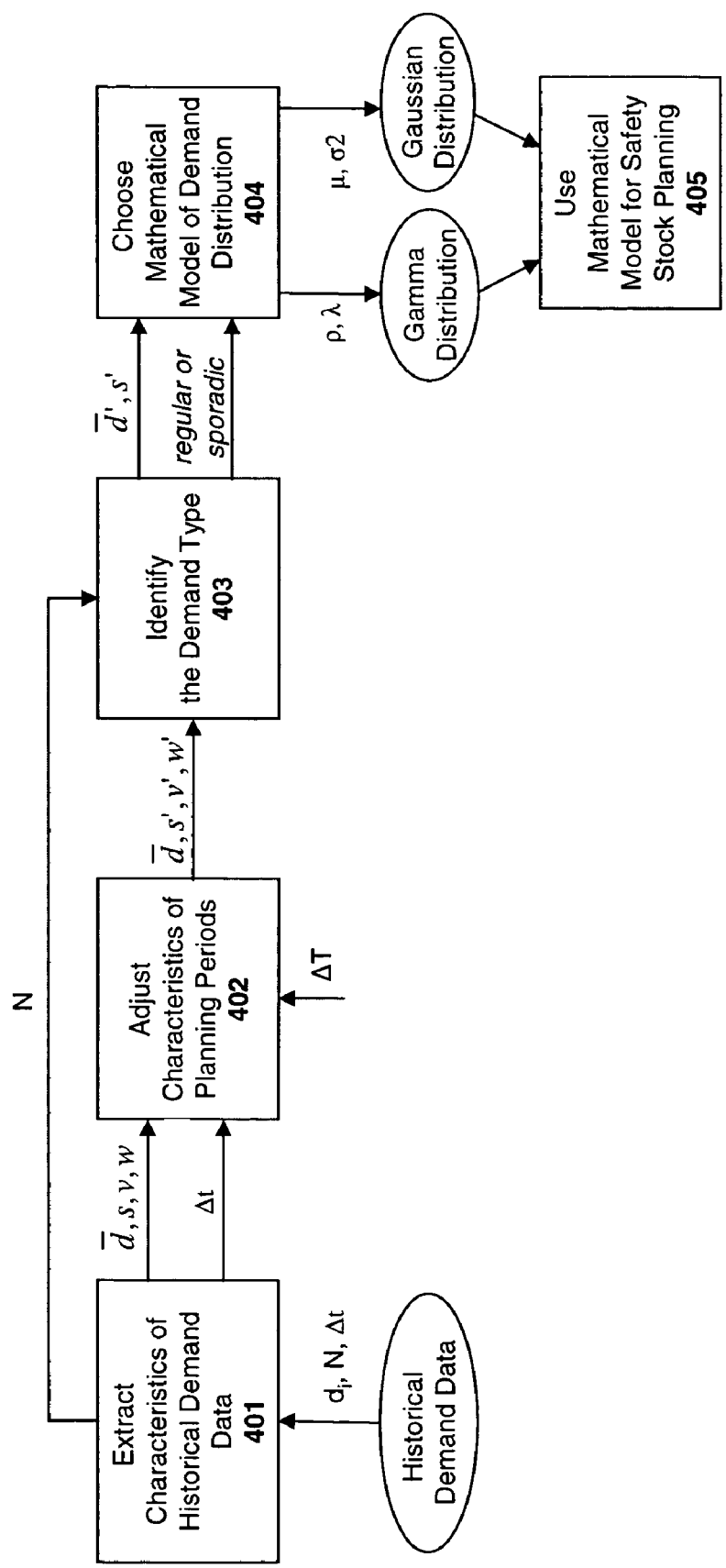
FIG. 4 illustrates a method for performing safety stock analysis according to one embodiment of the invention.

In one embodiment of the invention, the safety stock analysis module 301 implements the method shown in FIG. 4 to perform its safety stock calculations. Briefly, this method comprises: extracting certain characteristics of the historical demand data for the product (401); adjusting the demand characteristics to match future planning periods (402); identifying the demand type (403); choosing an appropriate mathematical model to describe the demand distribution (404); and using the selected mathematical model for safety stock planning (405).

401. Extracting Characteristics of Historical Demand Data

In one embodiment of the invention, the historical demand data of a product is provided as a time series of N demand values $d_1, d_2, \ldots, d_N$ with $d_i \geq 0$. Each demand value refers to a period of length $\Delta t$ (e.g., one day, one week, etc).

In one embodiment, the following characteristics of the historical demand data are used to determine the demand distribution:

N—the number of demand values;
$\bar{d}$—the mean demand;
s—the standard deviation of the demand values;
v—the variation coefficient of the demand values; and
w—the fraction of periods without any demand.

In one embodiment, these demand characteristics are calculated according to the following set of equations:

$$\bar{d} = \frac{1}{N} \sum_{i=1}^{N} d_i$$

$$s = \sqrt{\frac{1}{N-1} \sum_{i=1}^{N} (d_i - \bar{d})^2}$$

$$v = \frac{s}{\bar{d}}$$

$$w = \frac{1}{N} \sum_{i=1}^{N} \begin{cases} 1 & d_i = 0 \\ 0 & d_i > 0 \end{cases}$$

402. Adjusting Characteristics to the Future Planning Periods

As previously mentioned, one embodiment of the invention makes adjustments based on differences between historical demand periods and safety stock planning periods. More specifically, in one embodiment, if the length of a time period $\Delta t$ of the historical demand data is not the same as the length of a planning period $\Delta T$ in safety stock planning, the characteristics are adjusted accordingly.

The adjustment depends on whether $\Delta t$ is smaller than $\Delta T$ or vice versa. If $\Delta t < \Delta T$, the historical periods are smaller than the planning periods. This means that the historical data is more detailed than needed. Adjustment of the characteristics is done using the following approximation formulas:

$$\bar{d}' = \frac{\Delta T}{\Delta t} \bar{d}$$

$$s' = \sqrt{\frac{\Delta T}{\Delta t}} s$$

$$v' = \sqrt{\frac{\Delta t}{\Delta T}} v$$

$$w' = \frac{\Delta t}{\Delta T} w$$

If, however, $\Delta t > \Delta T$, then the historical periods are larger than the planning periods. This means that the historical data is less detailed than needed. Adjustment of the characteristics is done using the following approximation formulas:

$$\overline{d}' = \frac{\Delta T}{\Delta t}\overline{d}$$

$$s' = \frac{\Delta T}{\Delta t}s$$

$$v' = v$$

$$w' = w$$

If $\Delta t = \Delta T$, no adjustment of the characteristics is needed since historical periods and planning periods have the same length. Thus:

$$\overline{d}' = \overline{d}$$

$$s' = s$$

$$v' = v$$

$$w' = w$$

403. Identify the Demand Type

A well-founded statement of the demand type (e.g., "regular" vs. "sporadic") is possible only if a certain amount of historical demand data is available, i.e., $N \geq N_{threshold}$. If this holds then, in one embodiment of the invention, the demand type is determined in the following way:

Variable $C_1$ is set to 1 if the mean value of demand is not greater than a certain threshold value, i.e., $\overline{d}' \leq \overline{d}_{threshold}$. Otherwise, $C_1$ is set to 0.

Variable $C_2$ is set to 1 if the variation coefficient of demand is not smaller than a certain value, i.e., $v' \geq v_{threshold}$. Otherwise, $C_2$ is set to 0.

Variable $C_3$ is set to 1 if the fraction of periods without any demand is not smaller than a certain value, i.e., $w' \geq w_{threshold}$. Otherwise, $C_3$ is set to 0. If $a_1 C_1 + a_2 C_2 + a_3 C_3 \geq 1$ then the demand is regarded as "sporadic." Otherwise, it is regarded as "regular."

In one embodiment of the invention, if there is not enough historical demand data available, i.e., $N < N_{threshold}$, then the demand is regarded as "regular."

The following values for thresholds and weighing factors may be employed in the foregoing equations:

$$N_{threshold} = 10$$

$$\overline{d}_{threshold} = 10$$

$$v_{threshold} = 0.5$$

$$w_{threshold} = 0.3$$

$$a_1 = 1$$

$$a_2 = 1$$

$$a_3 = 1$$

It should be noted, however, that the foregoing equations and variables are suggested merely for the purpose of explanation. The underlying principles of the invention are not limited to any specific set of equations/variables.

404. Choosing a Mathematical Model of the Demand Distribution

In one embodiment of the invention, if the demand is determined to be "regular," then the Gaussian distribution $N(\mu, \sigma^2)$ is chosen as a mathematical model of the demand distribution. In this case, parameter $\mu$ is set to $\overline{d}'$ and parameter $\sigma^2$ is set to $(s')^2$.

By contrast, if the demand is defined as sporadic, the Gamma distribution $\Gamma(p, \lambda)$ is chosen as the mathematical model of the demand distribution. In this case, parameter p is set to $$\frac{(\overline{d}')^2}{(s')^2}$$

and parameter $\lambda$ is set to $$\frac{\overline{d}'}{(s')^2}.$$

405. Using the Selected Mathematical Model for Safety Stock Planning

In one embodiment of the invention, once the mathematical model of the demand distribution is selected, it is used to perform safety stock planning calculations. For example, if the demand distribution is identified as sporadic, a relatively higher percentage of safety stock may be allocated for the product (i.e., to provide for the relative uncertainty associated with a sporadic demand distribution). By contrast, if the demand distribution is identified as regular, a relatively lower percentage of safety stock may be allocated for the product (i.e., due to the relative certainty associated with a regular demand distribution).

FIGS. 5*a-d* illustrate various formulas for determining an amount of safety stock to use given the foregoing calculations. FIG. 5*a* ("Method AS") shows formulas for calculating the amount of safety stock SStck to be used if a reorder point strategy is used for Inventory Planning and the specified service level is of type alpha. A reorder point strategy means that a new procurement is triggered whenever the stock falls to or below a given level s. An alpha service level of $\alpha$% means that the probability of a shortfall in a planning period is $(100-\alpha)$%. If the demand distribution is identified as regular the formulas on the left hand side are used; if the demand distribution is identified as sporadic the formulas on the right hand side are used.

FIG. 5*b* ("Method AT") shows formulas for calculating the amount of safety stock SStck to be used if a reorder cycle strategy is used for Inventory Planning and the specified service level is of type alpha. A reorder cycle strategy means that a new procurement is triggered every T planning periods (regardless of the stock level). An alpha service level of $\alpha$% means that the probability of a shortfall in a planning period is $(100-\alpha)$%. If the demand distribution is identified as regular the formulas on the left hand side are used; if the demand distribution is identified as sporadic the formulas on the right hand side are used.

FIG. 5*c* ("Method BS") shows formulas for calculating the amount of safety stock SStck to be used if a reorderpoint strategy is used for Inventory Planning and the specified service level is of type beta. A reorder point strategy means that a new procurement is triggered whenever the stock falls to or below a given level s. A beta service level of $\beta$% means that the ratio of the shortfall quantity and the overall demand in a planning period is $(100-\beta)$% on average. If the demand distribution is identified as regular the formulas on the left hand side are used; if the demand distribution is identified as sporadic the formulas on the right hand side are used.

FIG. 5d ("Method BT") shows formulas for calculating the amount of safety stock SStck to be used if a reorder cycle strategy is used for Inventory Planning and the specified service level is of type beta. A reorder cycle strategy means that a new procurement is triggered every T planning periods (regardless of the stock level). A beta service level of β% means that the ratio of the shortfall quantity and the overall demand in a planning period is (100–β)% on average. If the demand distribution is identified as regular the formulas on the left hand side are used; if the demand distribution is identified as sporadic the formulas on the right hand side are used.

Figure 6:
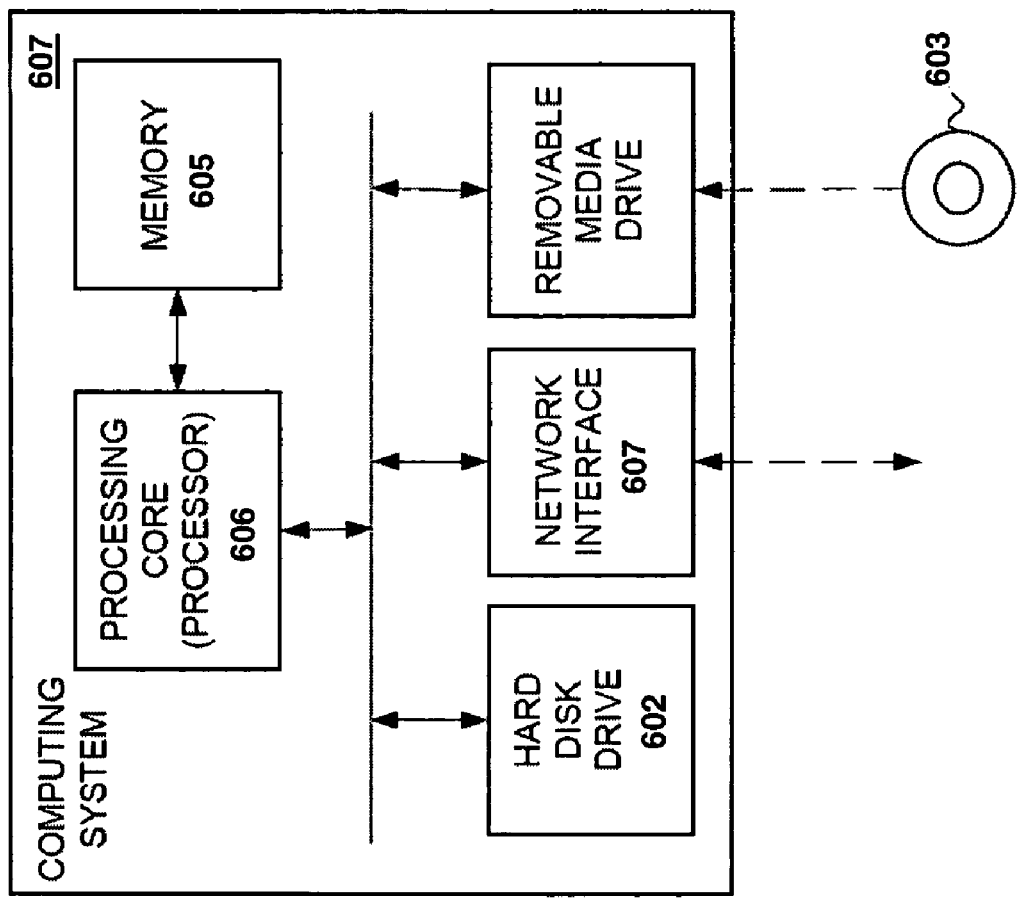
FIG. 6 illustrates an exemplary computer system on which embodiments of the invention are implemented.

FIG. 6 is a block diagram of an exemplary computing system 600 that can execute program code stored by an article of manufacture. It is important to recognize that the computing system block diagram of FIG. 6 is just one of various computing system architectures on which the embodiments of the invention may be implemented. The applicable article of manufacture may include one or more fixed components (such as a hard disk drive 602 or memory 605) and/or various movable components such as a CD ROM 603, a compact disc, a magnetic tape, etc. In order to execute the program code, typically instructions of the program code are loaded into the Random Access Memory (RAM) 605; and, the processing core 606 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 606. In one particular embodiment, the computing system 600 is the SAP Web Application Server currently available from SAP AG.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

The present invention may also be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the description above focused on an APO architecture, the underlying principles of the invention are not limited to this architecture. Moreover, although specific equations were set forth above for performing safety stock calculations, the underlying principles of the invention are not limited to these equations. Accordingly, the scope and spirit of the invention should be judged in terms of the claims which follow.

What is claimed is:

1. A computer-implemented method comprising:
extracting, by a computer, historical demand characteristics of a demand for a product from a specified data source, the demand characteristics including the mean value of the demand for specified periods of time and/or the fraction of periods without any demand;
evaluating, in a computer, the historical demand characteristics including the mean value of the demand for the specified periods and/or the fraction of periods without any demand;
based on the evaluation, categorizing the demand as regular or sporadic;
using the categorization to perform, using a computer, safety stock calculations for the product over the specified periods of time;
employing a reorder cycle planning strategy with an alpha service level target wherein a probability of a shortfall in a planning period is given by (100-alpha)%;
determining, using a computer, the safety stock for a planning period by performing the safety stock calculations using a set of formulae;
and wherein for reorder cycle planning with an alpha service level with regular demand the set of formulae is given as:

$$SStck = F_{N(0,1)}^{-1}\left(\frac{\alpha}{100}\right)\sigma_{D+L}\sqrt{L+T_R},$$

and wherein for reorder cycle planning with an alpha service level with sporadic demand the set of formulae are given as:

$$p = \frac{(D(L+T_R))^2}{\left(\sigma_{D+L}\sqrt{L+T_R}\right)^2},$$

$$\lambda = \frac{D(L+T_R)}{\left(\sigma_{D+L}\sqrt{L+T_R}\right)^2},$$

$$S = F_{\Gamma(p,\lambda)}^{-1}\left(\frac{\alpha}{100}\right),$$

SStck=S−D(L+$T_R$), wherein:
α alpha service level [in %],
D demand forecast for the current period,
L replenishment lead time for the current period [in periods],
$\sigma_{D+L}$ forecast error for the current period,
$T_R$ reorder cycle [in periods],
$F_\Gamma$ Gamma distribution, and
$F_N$ Gaussian distribution.

2. The method as in claim 1 further comprising:
determining whether the historical demand periods and safety stock planning periods are equal; and
if the historical demand periods and safety stock planning periods are not equal, then adjusting the historical demand characteristics to compensate for the difference.

3. The method as in claim 1 wherein the demand characteristics further include a variation coefficient of the demand.

4. The method as in claim 1 wherein the lower the mean value of the demand for the specified periods of time and/or the greater the fraction of periods without any demand, the more likely the demand will be characterized as sporadic.

5. The method as in claim 4 wherein if there is not enough historical demand data available, such that $N<N_{threshold}$, the demand is regarded as regular.

6. A non-transitory machine-readable medium having program code stored thereon which, when executed by a machine, causes the machine to perform the operations of:
   extracting historical demand characteristics of a demand for a product from a specified data source, the demand characteristics including the mean value of the demand for specified periods of time and/or the fraction of periods without any demand;
   evaluating, in a computer, the historical demand characteristics including the mean value of the demand for the specified periods and/or the fraction of periods without any demand;
   based on the evaluation, categorizing the demand as regular or sporadic;
   using the categorization to perform safety stock calculations for the product over the specified periods of time;
   employing a reorder cycle planning strategy with a beta service level target wherein the ratio of a shortfall quantity and an overall demand quantity for a period is (100-beta)%;
   determining, using a computer, the safety stock for a planning period by performing the safety stock calculations using a set of formulae;
   and wherein for reorder cycle planning with a beta service level with regular demand the set of formulae is given as:

$$x_1 = \left(1 - \frac{\beta}{100}\right)T_R D,$$

$$x_2 = \sigma_{D+L}\sqrt{L + T_R},$$

$$k = \Psi_2^{-1}\left(\frac{x_1}{x_2}\right), \text{ with}$$

$$\Psi_2(x) = \int_x^\infty (t-x)f_{N(0,1)}(t)\,dt,$$

$$SStck = k\sigma_{D+L}\sqrt{L+T_R},$$

and wherein for reorder cycle planning with a beta service level with sporadic demand the set of formulae is given as:

$$p = \frac{D^2(L+T_R)}{\sigma_{D+L}^2},$$

$$\lambda = \frac{D}{\sigma_{D+L}^2},$$

$$S = \Psi_4^{-1}\left(\frac{\beta}{100}\right) (S - \text{order-up-to level}), \text{ with}$$

$$\Psi_4(S) = 1 - \frac{1}{DT_R}\int_S^\infty (t-S)f_{\Gamma(p,\lambda)}(t)\,dt,$$

SStck=S−D(L+$T_R$), wherein:
β beta service level [in %],
D demand forecast for the current period,
L replenishment lead time for the current period [in periods],
$\sigma_{D+L}$ forecast error for the current period,
$T_R$ reorder cycle [in periods],
$F_\Gamma$ Gamma distribution, and
$F_N$ Gaussian distribution.

7. The machine-readable medium as in claim 6 comprising additional program code to cause the machine to perform the operations of:
   determining whether the historical demand periods and safety stock planning periods are equal; and
   if the historical demand periods and safety stock planning periods are not equal, then adjusting the historical demand characteristics to compensate for the difference.

8. The machine-readable medium as in claim 6 wherein the demand characteristics further include a variation coefficient of the demand.

9. The machine-readable medium as in claim 6 wherein the lower the mean value of the demand for the specified periods of time and/or the greater the fraction of periods without any demand, the more likely the demand will be characterized as sporadic.

10. The machine-readable medium as in claim 9 wherein if there is not enough historical demand data available, such that $N<N_{threshold}$ then the demand is regarded as regular.

11. A system comprising:
   a memory for storing program code;
   a processor for processing the program code to perform the operations of:
      extracting historical demand characteristics of a demand for a product from a specified data source, the demand characteristics including the mean value of the demand for specified periods of time and/or the fraction of periods without any demand;
      evaluating, in a computer, the historical demand characteristics including the mean value of the demand for the specified periods and/or the fraction of periods without any demand;
      based on the evaluation, categorizing the demand regular or sporadic;
      using the categorization to perform safety stock calculations for the product over the specified periods of time; and
   employing a reorder point planning strategy with a beta service level target wherein the ratio of a shortfall quantity and an overall demand quantity for a period is (100-beta)%;
   determining, using a computer, the safety stock for a planning period by performing the safety stock calculations using a set of formulae;
   and wherein for reorder point planning with a beta service level with regular demand the set of formulae is given as:

$$x_1 = \left(1 - \frac{\beta}{100}\right)(2QD + D^2 + \sigma_{D+L}^2),$$

$$x_2 = \sigma_{D+L}^2(L+T_C),$$

$$k = \Psi_1^{-1}\left(\frac{x_1}{x_2}\right), \text{ with}$$

$$\Psi_1(x) = \int_x^\infty (t-x)^2 f_{N(0,1)}(t)\,dt,$$

$$SStck = k\sigma_{D+L}\sqrt{L+T_C},$$

and wherein for reorder point planning with a beta service level with sporadic demand the set of formulae is given as:

$$p_1 = \frac{D^2(L+T_C)}{\sigma_{D+L}^2},$$

-continued $$p_2 = \frac{D^2 L}{\sigma_{D+L}^2},$$

$$\lambda = \frac{D}{\sigma_{D+L}^2},$$

$$s = \Psi_3^{-1}\left(\frac{\beta}{100}\right), \text{ with}$$

$$\Psi_3(s) =$$
$$1 - \frac{1}{2QD + D^2 + \sigma_{D+L}^2}\left(\int_s^\infty (t-s) f_{\Gamma(p1,\lambda)}(t) dt - \int_s^\infty (t-s)^2 f_{\Gamma(p2,\lambda)}(t) dt\right),$$

SStck=s−D(L +$T_C$), wherein:
β beta service level [in %],
D demand forecast for the current period,
L replenishment lead time for the current period [in periods],
$\sigma_{D+L}$ forecast error for the current period,
$T_C$ control period [in periods],
Q reorder quantity,
$F_\Gamma$ Gamma distribution, and
$F_N$ Gaussian distribution.

12. The system as in claim 11, wherein the program code executed by the processor causes the processor to perform the additional operations of:
determining whether the historical demand periods and safety stock planning periods are equal; and
if the historical demand periods and safety stock planning periods are not equal, then adjusting the historical demand characteristics to compensate for the difference.

13. The system as in claim 11 wherein the demand characteristics further include a variation coefficient of the demand.

14. A computer-implemented method comprising:
extracting, by a computer, historical demand characteristics of a demand for a product from a specified data source, the demand characteristics including the mean value of the demand for specified periods of time and/or the fraction of periods without any demand;
evaluating, in a computer, the historical demand characteristics including the mean value of the demand for the specified periods and/or the fraction of periods without any demand;
based on the evaluation, categorizing the demand as regular or sporadic;
using the categorization to perform, using a computer, safety stock calculations for the product over the specified periods of time;
employing a reorder point planning strategy with an alpha service level target wherein a probability of a shortfall in a planning period is given by (100-alpha)%;
determining, using a computer, the safety stock for a planning period by performing the safety stock calculations using a set of formulae;
and wherein for reorder point planning with an alpha service level with regular demand the set of formulae is given as:

$$SStck = F_{N(0,1)}^{-1}\left(\frac{\alpha}{100}\right)\sigma_{D+L}\sqrt{L+T_C},$$

and wherein for reorder point planning with an alpha service level with sporadic demand the set of formulae are given as:

$$p = \frac{(D(L+T_C))^2}{\left(\sigma_{D+L}\sqrt{L+T_C}\right)^2},$$

$$\lambda = \frac{D(L+T_C)}{\left(\sigma_{D+L}\sqrt{L+T_C}\right)^2},$$

$$s = F_{\Gamma(p,\lambda)}^{-1}\left(\frac{\alpha}{100}\right),$$

SStck=s−D(L +$T_C$), wherein:
α alpha service level [in %],
D demand forecast for the current period,
L replenishment lead time for the current period [in periods],
$\sigma_{D+L}$ forecast error for the current period,
$T_C$ control period [in periods],
$F_\Gamma$ Gamma distribution, and
$F_N$ Gaussian distribution.

* * * * *